(12) United States Patent
Girard et al.

(10) Patent No.: US 11,821,363 B1
(45) Date of Patent: Nov. 21, 2023

(54) APPARATUS FOR REMOVING PARTICULATE MATTER FROM BLEED GAS AND GAS TURBINE ENGINE INCLUDING SAME

(71) Applicant: Pratt & Whitney Canada Corp., Longueuil (CA)

(72) Inventors: Julien Girard, Sainte-Julie (CA); Sylvain Lamarre, Boucherville (CA); Xiaoliu Liu, Mississauga (CA); David Koo, Toronto (CA); Kevin Nguyen, Montreal (CA); Liam McPherson, Ottawa (CA); AnnMarie Unnippillil, Toronto (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/738,363

(22) Filed: May 6, 2022

(51) Int. Cl.
*F02C 7/052* (2006.01)
*F02C 7/04* (2006.01)
(Continued)

(52) U.S. Cl.
CPC ............... *F02C 7/052* (2013.01); *F02C 7/04* (2013.01); *F02C 6/08* (2013.01); *F02C 9/18* (2013.01)

(58) Field of Classification Search
CPC .... F02C 7/04; F02C 7/05; F02C 7/052; F02C 9/18; F02C 6/08; B64D 2033/022; B64D 2033/0246; B64D 33/00; B01D 45/00; B01D 45/02; B01D 45/04; B01D 45/06; B01D 45/08; B01D 45/10; B01D 45/12; B01D 45/14; B01D 45/16; B01D 45/18; F05D 2260/607
See application file for complete search history.

(56) References Cited

U.S. PATENT DOCUMENTS 3,449,891 A * 6/1969 Amelio ................. B01D 45/16
  55/306
3,811,254 A * 5/1974 Amelio .................... F04F 5/46
  55/306
(Continued)

FOREIGN PATENT DOCUMENTS

RU        2109971 C1    4/1998
WO     2016032585 A2    3/2016

OTHER PUBLICATIONS

EP search report for EP23171710.9 dated Sep. 21, 2023.

*Primary Examiner* — William H Rodriguez
(74) *Attorney, Agent, or Firm* — Getz Balich LLC

(57) ABSTRACT

An intake device for a gas turbine engine includes a snorkel and a particle separator. The snorkel is configured to be mounted to a panel defining at least a portion of a gas flow path within the gas turbine engine. The snorkel includes a tubular body extending between a closed end and an open end opposite the closed end. The snorkel further includes an inlet aperture formed through the tubular body adjacent the closed end. At least a portion of the snorkel is configured to be disposed within the gas flow path. The particle separator is mounted to the snorkel downstream of the inlet aperture. The particle separator includes at least one gas flow passage extending between a flow inlet and a flow outlet. The at least one gas flow passage is configured to remove particulate matter from the at least one gas flow passage upstream of the flow outlet.

12 Claims, 8 Drawing Sheets

(51) Int. Cl.
*F02C 9/18* (2006.01)
*F02C 6/08* (2006.01)

(56) References Cited

U.S. PATENT DOCUMENTS

| | | | |
|---|---|---|---|
| 4,047,379 A * | 9/1977 | Brookes | G01K 13/028 |
| | | | 374/135 |
| 4,289,611 A * | 9/1981 | Brockmann | B04C 3/06 |
| | | | 209/710 |
| 4,463,552 A | 8/1984 | Monhardt | |
| 5,123,240 A | 6/1992 | Frost | |
| 5,222,693 A * | 6/1993 | Slutzkin | F01D 25/32 |
| | | | 55/467 |
| 5,279,109 A * | 1/1994 | Liu | F02K 3/075 |
| | | | 60/785 |
| 6,701,715 B2 | 3/2004 | Anderson | |
| 7,931,740 B2 * | 4/2011 | Al-Alusi | B01D 45/16 |
| | | | 95/271 |
| 8,572,985 B2 * | 11/2013 | Waddleton | F02C 6/08 |
| | | | 60/785 |
| 10,287,992 B2 | 5/2019 | Tan | |
| 10,512,876 B2 | 12/2019 | Mercier | |
| 2010/0326090 A1 * | 12/2010 | Waddleton | F02C 9/18 |
| | | | 60/785 |
| 2012/0180886 A1 * | 7/2012 | Army | F02C 6/08 |
| | | | 137/15.01 |
| 2014/0109589 A1 * | 4/2014 | Pritchard, Jr. | F02C 6/08 |
| | | | 60/785 |
| 2016/0312698 A1 * | 10/2016 | Judd | F02C 7/052 |
| 2017/0122202 A1 * | 5/2017 | Rahaim | F02C 7/052 |
| 2017/0138263 A1 * | 5/2017 | Duge | B64D 33/02 |
| 2017/0209824 A1 * | 7/2017 | Abbott | B01D 45/08 |
| 2017/0226926 A1 * | 8/2017 | Army | F02C 6/08 |
| 2018/0021711 A1 * | 1/2018 | Mook | B01D 45/08 |
| | | | 95/269 |
| 2018/0023473 A1 * | 1/2018 | Manteiga | B01D 45/16 |
| | | | 95/34 |
| 2018/0023595 A1 * | 1/2018 | Mook | F04D 17/02 |
| | | | 415/1 |
| 2018/0229586 A1 * | 8/2018 | Army | B60H 3/0658 |
| 2019/0329899 A1 * | 10/2019 | Edler | B64D 33/02 |
| 2022/0074426 A1 * | 3/2022 | Schugardt | F02C 7/052 |
| 2022/0154641 A1 * | 5/2022 | Judd | B01D 45/16 |
| 2022/0412259 A1 * | 12/2022 | Dobson | F02C 6/08 |
| 2023/0029960 A1 * | 2/2023 | Dobson | F04D 27/0215 |

* cited by examiner

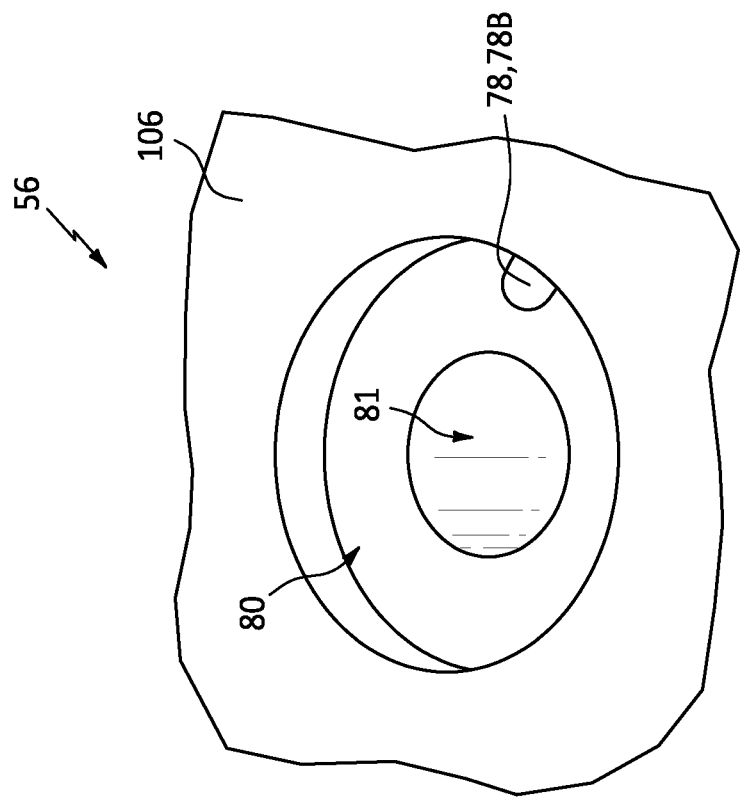
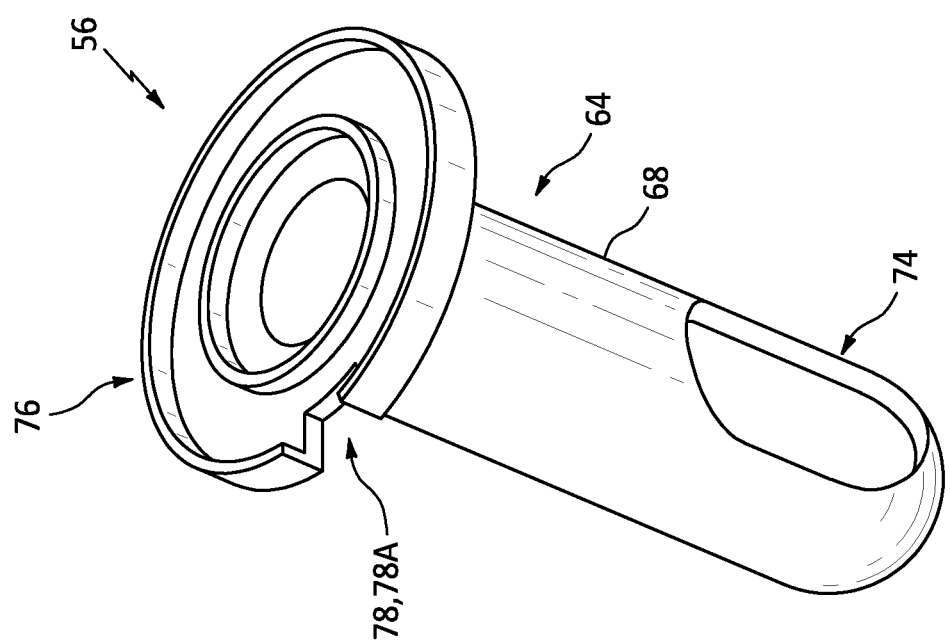

APPARATUS FOR REMOVING PARTICULATE MATTER FROM BLEED GAS AND GAS TURBINE ENGINE INCLUDING SAME

TECHNICAL FIELD

This disclosure relates generally to bleed air systems for gas turbine engines and, more particularly, to systems and methods for removing particulate matter from bleed gas.

BACKGROUND OF THE ART

Gas turbine engines, such as those used for aircraft propulsion, may use pressurized bleed gas (e.g., bleed air from a compressor) for operation of one or more systems of the gas turbine engine. Depending on the source of the bleed gas, some amount of contaminants may be present and may be entrained with or otherwise carried by the bleed gas. Some pneumatic system components which use the bleed gas may be particularly sensitive to the presence of contaminants, such as particulate matter, within the bleed gas. Various systems and methods are known in the art for reducing the impact of particulate matter on pneumatic system components. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an intake device for a gas turbine engine includes a snorkel and a particle separator. The snorkel is configured to be mounted to a panel defining at least a portion of a gas flow path within the gas turbine engine. The snorkel includes a tubular body extending between a closed end and an open end opposite the closed end. The snorkel further includes an inlet aperture formed through the tubular body adjacent the closed end. At least a portion of the snorkel is configured to be disposed within the gas flow path. The particle separator is mounted to the snorkel downstream of the inlet aperture. The particle separator includes at least one gas flow passage extending between a flow inlet and a flow outlet. The at least one gas flow passage is configured to remove particulate matter from the at least one gas flow passage upstream of the flow outlet.

In any of the aspects or embodiments described above and herein, the intake device may further include a collection chamber in fluid communication with the at least one gas flow passage.

In any of the aspects or embodiments described above and herein, the particle separator may include a helical member disposed within the tubular body. The helical member may be configured to define a helical flow path for the at least one gas flow passage.

In any of the aspects or embodiments described above and herein, the tubular body may include a particle separator aperture formed through a portion of the tubular body between the closed end and the open end. The particle separator aperture may be aligned with an inlet of the collection chamber.

In any of the aspects or embodiments described above and herein, the particle separator may include a curved channel located downstream of the open end of the tubular body. The curved channel may include an inlet passage including the flow inlet. The curved channel may further include an inner diameter passage and an outer diameter passage separated from the inner diameter passage. The inner diameter passage and the outer diameter passage may be located downstream of the inlet passage. The inner diameter passage may have a first radius of curvature which is different than a second radius of curvature of the outer diameter passage.

In any of the aspects or embodiments described above and herein, the intake device may further include a housing mounted to the snorkel. The housing may define a collection chamber. The collection chamber may be located downstream of the open end of the tubular body. The collection chamber may include a chamber outlet. The collection chamber may include a serpentine passage which defines a bleed flow path between the open end of the tubular body and the chamber outlet.

In any of the aspects or embodiments described above and herein, the intake device may further include a filter disposed downstream of the particle separator.

According to another aspect of the present disclosure, a gas turbine engine includes a compressor section, a cavity, an engine case, and an intake device. The compressor section is disposed about an axial centerline of the gas turbine engine. The compressor section defines a portion of a core flow path through the gas turbine engine. The cavity is disposed downstream of the compressor section with respect to the core flow path. The engine case is disposed about the axial centerline. The engine case surrounds the cavity. The intake device is mounted to the engine case. The intake device is in fluid communication with the cavity. The intake device is configured to receive pressurized bleed gas from the cavity. The intake device includes a snorkel and a particle separator. The snorkel includes a tubular body extending between a closed end and an open end opposite the closed end. The snorkel further includes an inlet aperture formed through the tubular body proximate the closed end. The inlet aperture is positioned within the cavity. The particle separator is mounted to the snorkel downstream of the inlet aperture. The particle separator includes at least one gas flow passage extending between a flow inlet and a flow outlet. The at least one gas flow passage is configured to remove particulate matter from the at least one gas flow passage upstream of the flow outlet.

In any of the aspects or embodiments described above and herein, the gas turbine engine may further include a bleed-off valve in fluid communication with the intake device. The bleed-off valve may be configured to receive the pressurized bleed gas from the intake device.

In any of the aspects or embodiments described above and herein, the bleed-off valve may be in fluid communication with the core flow path within the compressor section via a pressure relief line.

In any of the aspects or embodiments described above and herein, the gas turbine engine may further include a pneumatic actuator in fluid communication between the intake device and the bleed-off valve. The pneumatic actuator may be configured to operate the bleed-off valve between a closed position and an open position in response to pressurized bleed gas supplied to the pneumatic actuator from the intake device.

In any of the aspects or embodiments described above and herein, the gas turbine engine may further include an orifice pack in fluid communication between the intake device and the pneumatic actuator.

In any of the aspects or embodiments described above and herein, the compressor section may be configured to impart a swirl component on the pressurized bleed gas within the cavity. The swirl component may have a swirl direction about the axial centerline of the gas turbine engine. The inlet aperture of the snorkel may be located facing away from the swirl direction.

In any of the aspects or embodiments described above and herein, the gas turbine engine may further include a combustor. The intake device may be located in the core flow path between the compressor section and the combustor.

In any of the aspects or embodiments described above and herein, the intake device may include a mistake-proofing feature.

In any of the aspects or embodiments described above and herein, the inlet aperture may be spaced radially inward of the engine case with respect to the axial centerline.

In any of the aspects or embodiments described above and herein, the intake device may further include a collection chamber in fluid communication with the at least one gas flow passage upstream of the flow outlet.

In any of the aspects or embodiments described above and herein, the collection chamber may be formed in a portion of the engine case and the collection chamber may be positioned adjacent the tubular body of the intake device.

In any of the aspects or embodiments described above and herein, the intake device may further include a housing mounted to the snorkel. The housing may define the collection chamber. The collection chamber may be located downstream of the open end of the tubular body.

In any of the aspects or embodiments described above and herein, the collection chamber may include a chamber outlet. The collection chamber may further include a serpentine passage defining a bleed flow path between the open end of the tubular body and the chamber outlet.

The present disclosure, and all its aspects, embodiments and advantages associated therewith will become more readily apparent in view of the detailed description provided below, including the accompanying drawings.

DESCRIPTION OF THE DRAWINGS

FIG. 3A-B illustrate perspective views of portions of an intake device, in accordance with one or more embodiments of the present disclosure.

DETAILED DESCRIPTION

Figure 1:
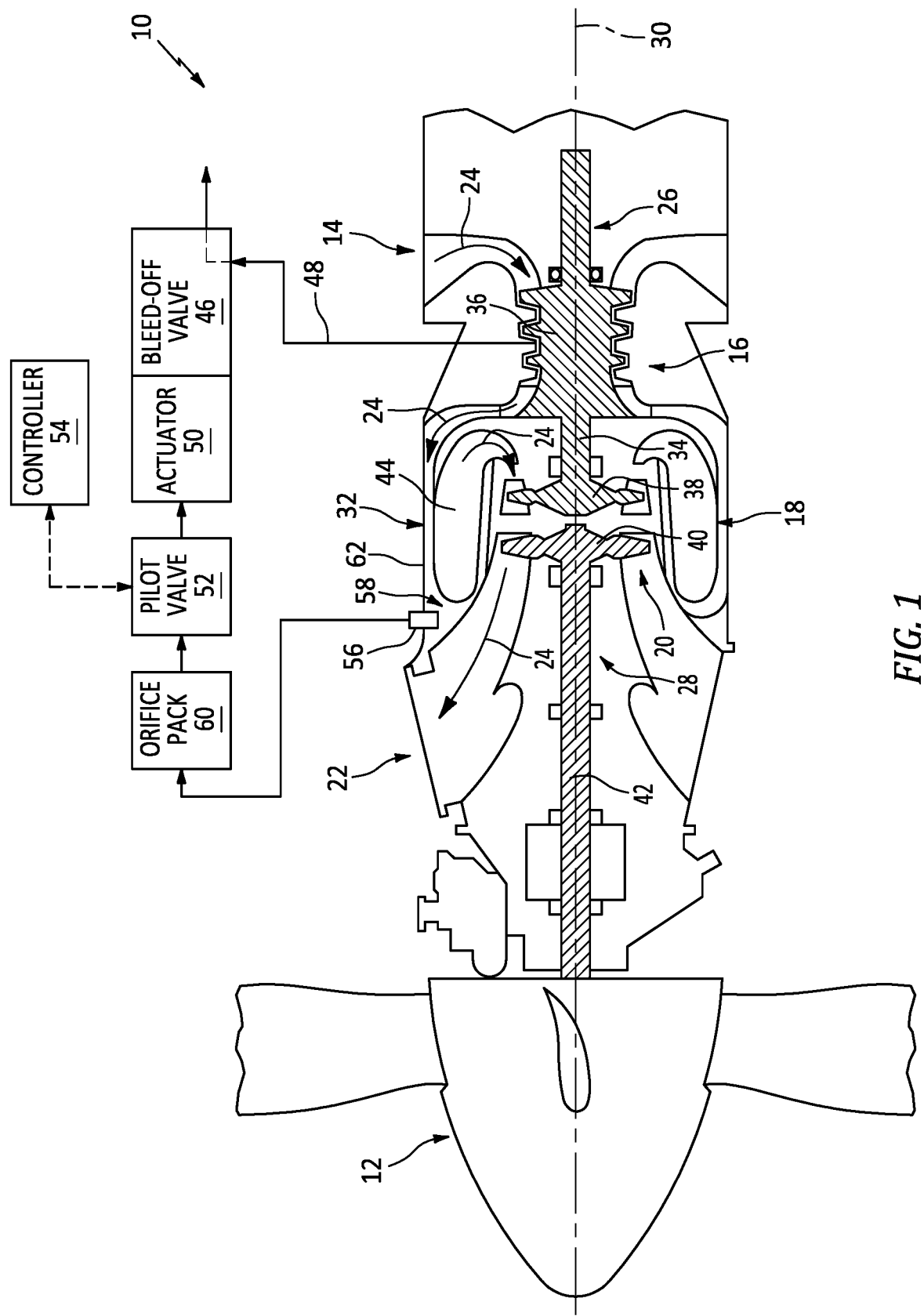
FIG. 1 illustrates a schematic view of a gas turbine engine, in accordance with one or more embodiments of the present disclosure.

FIG. 1 schematically illustrates a gas turbine engine 10. The gas turbine engine 10 of FIG. 1 is a multi-spool turboprop engine. However, while the following description and accompanying drawings refer to a turboprop engine as an example, it should be understood that aspects of the present disclosure may be equally applicable to other types of gas turbine engines including, but not limited to, a turboshaft gas turbine engine, a turbofan gas turbine engine, or a turbojet gas turbine engine. The gas turbine engine 10 of FIG. 1 is configured to drive (e.g., apply a rotational force to) a propeller 12. This gas turbine engine 10 includes an air inlet 14, a compressor section 16, a combustor section 18, a turbine section 20, and an exhaust outlet 22. The compressor section 16 drives air from the air inlet 14 along a core flow path 24 for compression and communication into the combustor section 18 and then expansion through the turbine section 20.

The gas turbine engine 10 of FIG. 1 includes a first rotational assembly 26 (e.g., a high-pressure spool), a second rotational assembly 28 (e.g., a low-pressure spool), an engine static structure 32 (e.g., an engine case), and an annular combustor 44. The first rotational assembly 26 and the second rotational assembly 28 are mounted for rotation about an axial centerline 30 (e.g., a rotational axis) of the gas turbine engine 10 relative to the engine static structure 32. The first rotational assembly 26 includes a first shaft 34, a first compressor 36, and a first turbine 38. The first shaft 34 interconnects the first compressor 36 and the first turbine 38. The second rotational assembly 28 includes a second turbine 40 and a second shaft 42. The second turbine 40 is connected to the second shaft 42. It should be understood that "low pressure" and "high pressure" or variations thereof as used herein are relative terms indicating that the high pressure is greater than the low pressure. The annular combustor 44 is disposed between the first compressor 36 and the first turbine 38 along the core flow path 24. In operation, airflow along the core flow path 24 is compressed by the first compressor 36, mixed and burned with fuel in the combustor 44, and then expanded through the first turbine 38 and the second turbine 40. The first turbine 38 and the second turbine 40 rotationally drive the first rotational assembly 26 and the second rotational assembly 28, respectively, in response to the expansion of the combustion gas. The combustion gas may then exit the gas turbine engine 10 via the exhaust outlet 22.

The first rotational assembly 26 and the second rotational assembly 28 of FIG. 1 are mechanically independent of one another so that they may rotate at different speeds and/or in opposite directions. The air flow through the gas turbine engine 10 of FIG. 1 along the core flow path 24 is directed in an aft-to-forward direction, where the air inlet 14 may be disposed in a portion of the gas turbine engine 10 which is aft of the combustor 44 and the exhaust outlet 22 may be disposed in a portion of the gas turbine engine 10 which is forward of combustor 44. The exemplary configuration of gas turbine engine 10 of FIG. 1 may be referred to as a "reverse-flow free turbine engine." As indicated above, the present disclosure is not limited to this gas turbine engine 10 example and is not limited to gas turbine engines featuring a reverse air flow.

The gas turbine engine 10 of FIG. 1 includes a bleed-off valve 46 (BOV), a pilot valve 52, an orifice pack 60, and an intake device 56. As will be discussed in further detail, the intake device 56 is in fluid communication with a pressurized gas cavity 58 of the gas turbine engine 10. The intake device 56 may be fluidly coupled to the orifice pack 60. The orifice pack 60 may be fluidly coupled to the pilot valve 52. The pilot valve 52 may be fluidly coupled to the bleed-off valve 46 (e.g., a pneumatic actuator of the bleed-off valve 46). In other words, the intake device 56 may be connected to the orifice pack 60, the orifice pack 60 may be connected to the pilot valve 52, and the pilot valve 52 may be connected to the bleed-off valve 46 using one or more conduits, pipes, tubes, cases, apertures, and the like, so that a fluid (e.g., a pressurized gas) is conveyed from a first component (e.g., the intake device 56) to a second component (e.g., the orifice pack 60).

The bleed-off valve 46 is in fluid communication with the core flow path 24 within the compressor section 16. For example, the bleed-off valve 46 of FIG. 1 is fluidly coupled with an intermediate stage of the first compressor 36 by a pressure relief line 48. The bleed-off valve 46 is configured to control (e.g., regulate) core gas flow along the core flow path 24 by selectively releasing core gas from the core flow path 24 to the surrounding atmosphere, based on operating conditions of the gas turbine engine 10. In other words, core gas from an intermediate stage of the first compressor 36 may flow through the pressure relief line 48 and may be released to the surrounding atmosphere by the bleed-off valve 46.

The bleed-off valve 46 may include or otherwise be in operable communication with a pneumatic actuator 50. The pneumatic actuator 50 may be operated by pressurized gas to selectively position the bleed-off valve 46 in a closed position, an open position, and a plurality of intermediate positions between the closed position and the open position, to control the release of the core gas from the core flow path 24. The bleed-off valve 46 may be opened at a relatively low rotational speed of the first rotational assembly 26 (e.g., a relatively low engine power condition) and may be closed at a relatively high rotational speed of the first rotational assembly 26 (e.g., a relatively high engine power condition).

The bleed-off valve 46 may be a piloted valve. The gas turbine engine 10 of FIG. 1, for example, includes the pilot valve 52 fluidly coupled to the pneumatic actuator 50. The pilot valve 52 is configured to control a flow of pressurized gas (e.g., bleed air or bleed gas) to the pneumatic actuator 50 to control the position of the bleed-off valve 46. The pilot valve 52 may be configured as, for example, a solenoid valve. The pilot valve 52 may be controlled using an electrical signal provided by a controller 54. The controller 54 may be configured to determine whether operating conditions of the gas turbine engine 10 satisfy criteria for releasing core gas from the core flow path 24 via the bleed-off valve 46, for example, based on signals from one or more sensors (e.g., pressure sensors, temperature sensors, etc.) disposed within the compressor section 16.

The controller 54 may include any type of computing device, computational circuit, processor(s), CPU, computer, or the like capable of executing a series of instructions that are stored in memory. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The controller 54 may include a single memory device or a plurality of memory devices (e.g., a computer-readable storage device that can be read, written, or otherwise accessed by a general purpose or special purpose computing device), including any processing electronics and/or processing circuitry capable of executing instructions. The present disclosure is not limited to any particular type of memory device, which may be non-transitory, and which may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) maybe directly or indirectly coupled to the controller 54. The controller 54 may include, or may be in communication with, an input device that enables a user to enter data and/or instructions, and may include, or be in communication with, an output device configured, for example to display information (e.g., a visual display or a printer), or to transfer data, etc. Communications between the controller 54 and the pilot valve 52, for example, may be via a hardwire connection or via a wireless connection. A person of skill in the art will recognize that portions of the controller 54 may assume various forms (e.g., digital signal processor, analog device, etc.) capable of performing the functions described herein.

Figure 2:
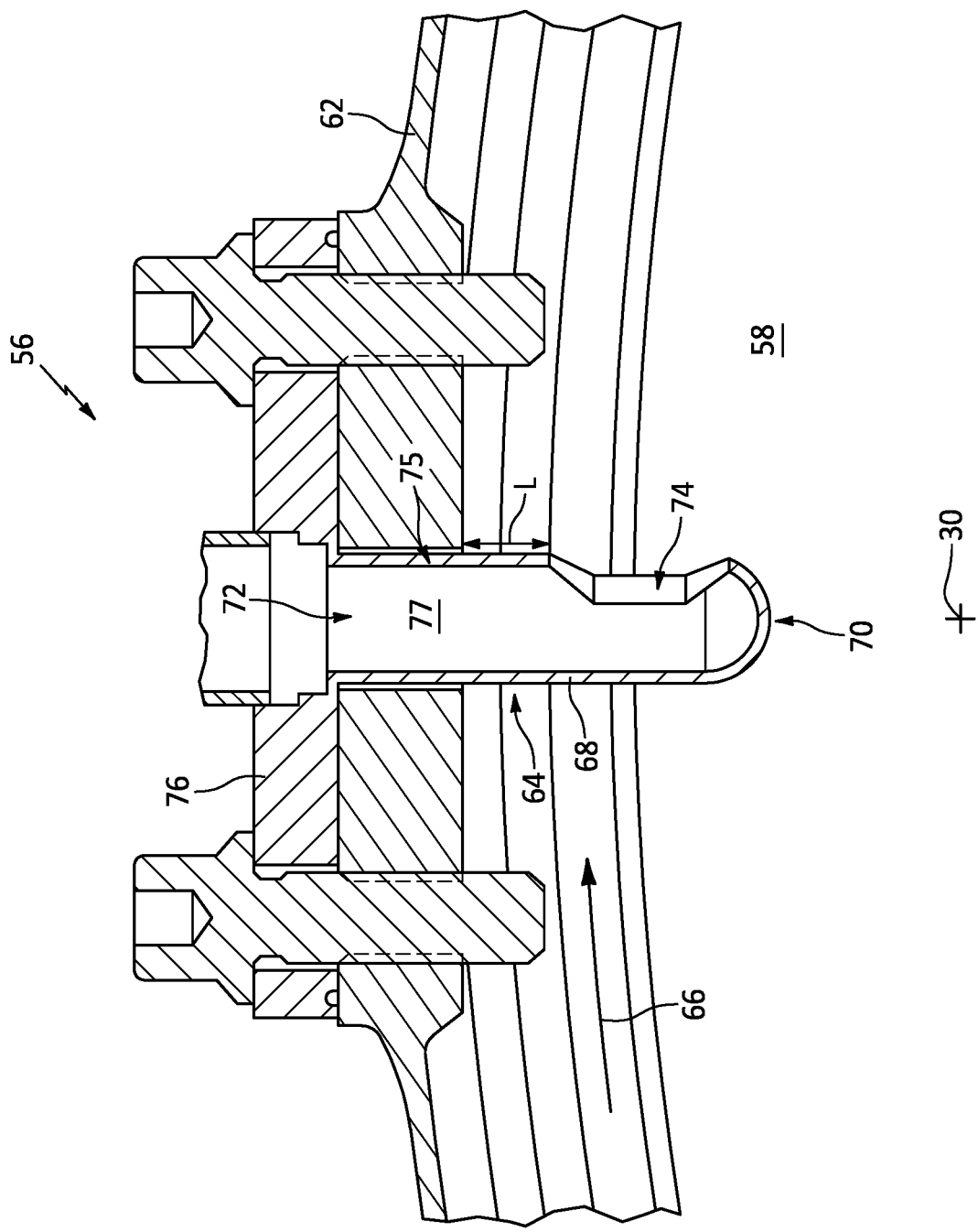
FIG. 2 illustrates a side, cross-sectional view of a portion of an intake device, in accordance with one or more embodiments of the present disclosure.

Referring to FIGS. 1 and 2, pressurized gas used for operation of the bleed-off valve 46 may be sourced from one or more locations within the gas turbine engine 10. The gas turbine engine 10 of FIG. 1, for example, includes a portion of the intake device 56 positioned within the cavity 58. The cavity 58 of FIG. 1 is formed, in part, by an engine case 62, which engine case 62 may form a portion of the engine static structure 32. The engine case 62 surrounds the cavity 58. The intake device 56 extends through the engine case 62 (e.g., a snorkel aperture of the engine case 62) with at least a portion of the intake device 56 positioned in the cavity 58. The cavity 58 of FIG. 1 includes a portion of the core flow path 24 between the first compressor 36 and the combustor 44. However, the intake device 56 of the present disclosure is not limited to use with the particular cavity 58 of FIG. 1 or with the core flow path 24.

Pressurized gas received by the intake device 56 may be supplied to the pneumatic actuator 50 for operation of the bleed-off valve 46. The cavity 58 of FIG. 1 may be located downstream of a highest-pressure compressor stage of the compressor section 16 along the core flow path 24. The pressurized gas from the cavity 58 may provide relatively high-pressure gas suitable for effecting operation of the bleed-off valve 46. Pressurized gas received by the intake device 56 may be conveyed to the pneumatic actuator 50 through the orifice pack 50. The orifice pack 50 may control (e.g., regulate) a pressure of the pressurized gas supplied to the bleed-off valve 46 by the intake device 56. The present disclosure is not limited to locating an intake device 56 in a highest-pressure compressor stage of the compressor section 16.

Gas within annular gas turbine engine cavities located within or downstream of a compressor section, such as the cavity 58, may exhibit a high degree of swirl. The gas flowing downstream from the first compressor 36, for example, may have a relatively high circumferential flow component, which causes the gas to swirl circumferentially about the axial centerline 30 as the gas flows downstream towards the combustor 44. Significant swirl velocity may be imparted on the gas by upstream rotating components such as those of the compressor section 16. The relatively high velocity of the swirling gas may allow the gas to carry particulate matter such as dust, dirt, sand, debris, etc. For example, gas received by the intake device 56 for operation of the bleed-off valve 46 may include particulate matter entrained with the gas. The particulate matter may have a size within a range of approximately 50 to 200 microns; however, particulate matter size may vary. Particulate matter ingested by the intake device 56 with the pressurized gas may be conveyed to downstream components such as the orifice pack 50, the pilot valve 52, and the pneumatic actuator 50. In particular, the bleed-off valve 46 and/or the pneumatic actuator 50 for the bleed-off valve 46 may exhibit some sensitivity to particulate matter exposure. For example, excessive build-up of particulate matter within the pneumatic actuator 50 can lead to improper operation of the bleed-off valve 46.

At least some conventional bleed air systems may include filters which may be used to remove particulate matter from bleed air. However, filters have limited contaminant accumulating capabilities and typically require replacement after a predetermined period of operational time or contaminant accumulation. Periodic filter replacement can lead to gas turbine engine downtime and substantial maintenance costs. Moreover, in harsh environments, such as those which include relatively high levels of airborne dust, sand, and other debris, conventional filters can quickly become clogged, thereby leading to improper operation of bleed air loads.

Referring to FIGS. 1-8, the present disclosure intake device 56 may eliminate or substantially reduce the quantity of particulate matter to which downstream components, such as the bleed-off valve 46, are exposed. While the present disclosure intake device 56 is described with respect to the operation of the bleed-off valve 46 of FIG. 1, it should be understood that aspects of the present disclosure intake device 56 are relevant to other bleed systems including components which may be sensitive to particulate matter entrained in the bleed gas. With respect to the intake device 56, the terms "upstream" and "downstream," as used herein, refer to the direction of bleed gas flow through the intake device 56 in a direction from the cavity 58 to the bleed-off valve 46.

The intake device 56 of FIGS. 1, 2, and 5-8 is mounted to an engine case 62 disposed about the axial centerline 30 and surrounding the cavity 58. While the intake device 56 is shown mounted to the engine case 62, in alternative embodiments, the intake device 56 may be mounted on an engine case, engine frame, or other structural panel which defines at least a portion of a gas flow path. The intake device 56 may include a snorkel 64. FIG. 2 illustrates a cross-sectional view of a portion of the intake device 56 with the snorkel 64 positioned within the cavity 58. FIG. 2 additionally illustrates an exemplary flow direction 66 representing the circumferential flow component of the swirling gas within the cavity 58. The snorkel 64 includes a tubular body 68, a base 76, an inlet aperture 74, and a gas passage 77. The tubular body 68 extends from the open end 72 to the closed end 70. The open end 72 is coincident with the base 76. The closed end 70 forms a distal end of the tubular body 68. The closed end 70 may be an imperforate portion of the tubular body 68. The tubular body 68 surrounds the gas passage 77. The gas passage 77 extends from the closed end 70 through the open end 72. The inlet aperture 74 is formed through the tubular body 68 between the gas passage 77 and an exterior of the tubular body 68. The inlet aperture 74 may be positioned at, adjacent, and/or proximate the closed end 70 of the tubular body 68. In some embodiments, the tubular body 68 may include an imperforate portion 75 between the inlet aperture 74 and the open end 72. In other words, the tubular body 68 may not be perforated in the imperforate portion 75 extending from the inlet aperture 74 to the open end 72 of the tubular body 68. In some embodiments, the tubular body 68 may be imperforate with the exception of only the inlet aperture 74 and the open end 72. The base 76 may extend outward from the tubular body 68. The base 76 may surround the tubular body 68 at or proximate the open end 72 of the tubular body 68. In some embodiments, the base 76 may be fixedly mounted to the engine case 62, for example, using one or more fasteners.

The tubular body 68 extends inward (e.g., radially inward) from the engine case 62. The tubular body 68 has a length L between the engine case 62 and the inlet aperture 74 of the snorkel 64. A greater concentration of particulate matter may be entrained within the gas flowing along the flow direction 66 in the immediate vicinity of the engine case 62. The length L may correspond to a gas flow region having a higher concentration of particulate matter. The location of the inlet aperture 74, with respect to the engine case 62, may correspond to a gas flow region having a relatively lower concentration of particulate matter. Thus, the position of the inlet aperture 74, spaced (e.g., radially spaced) from the engine case 62 may reduce the amount of particulate matter entrained with gas ingested by the intake device 56.

In some embodiments, the intake device 56 may be installed with the inlet aperture 74 of the snorkel 64 having a predetermined position and orientation relative to the flow direction 66 of gas within the cavity 58. As shown in FIG. 2, the inlet aperture 74 may be located in a portion of the tubular body 68 which faces away from the flow direction 66 of the gas within the cavity 58. For example, the inlet aperture 74 may face in a circumferential direction. Accordingly, the tubular body 68 may shield the inlet aperture 74 from direct impingement of particulate matter entrained with the gas, thereby further reducing the amount of particulate matter entrained with the gas ingested by the intake device 56.

Figure 5:
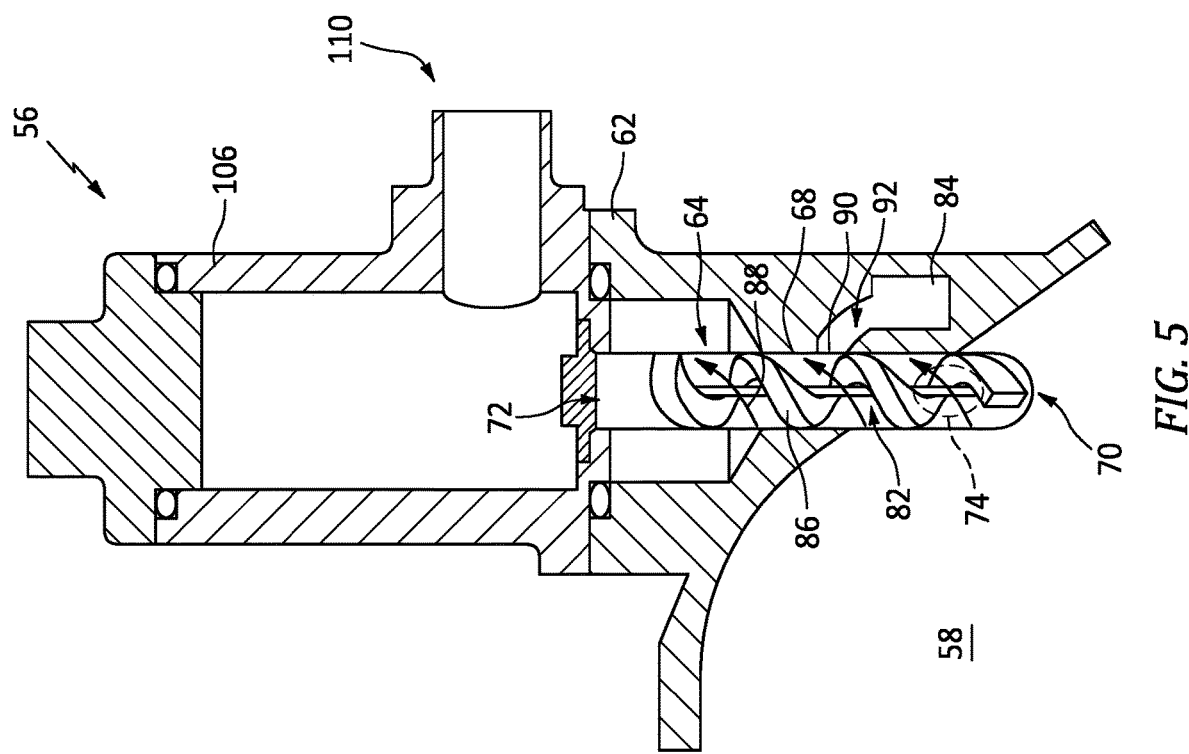
FIG. 5 illustrates a cutaway view of an intake device, in accordance with one or more embodiments of the present disclosure.

The intake device 56 may include a housing 106. The housing 106 may be positioned radially outside of the engine case 62. The housing 106 may be mounted to or otherwise positioned adjacent the base 76 and/or the engine case 62. For example, the housing 106 of FIG. 5 is mounted to the engine case 62, with the housing 106 positioned between the engine case 62 and the base 76 of the snorkel 64. The base 76 of FIG. 5 is mounted to the housing 106 such that the tubular body 68 extends through the housing 106 and then through the engine case 62. The housing 106 may surround a chamber 126 disposed downstream of the snorkel 64. The chamber 126 may be in fluid communication with the snorkel 64 via the open end 72 of the tubular body 68. The housing 106 may include an outlet 110. The outlet 110 may extend through the housing 106 between the chamber 126 and an exterior of the housing 106. The outlet 110 may be in fluid communication with the orifice pack 60 (see FIG. 1).

In some embodiments, the intake device 56 may include a mistake-proofing feature 78 configured to ensure that the intake device 56 is installed with the correct predetermined position and orientation of the inlet aperture 74 of the snorkel 64. FIG. 3A illustrates a perspective view of the snorkel 64 in which the base 76 includes a first portion 78A of the mistake-proofing feature 78. The first portion 78A of FIG. 3A includes an indentation formed in a circumferential perimeter of the base 76. FIG. 3B illustrates a perspective view of a portion of the housing 106. The housing 106 of FIG. 3B includes a recess 80 surrounding a snorkel aperture 81. The base 76 may be positioned within the recess 80 such that the tubular body 68 extends through the snorkel aperture 81 and the engine case 62 (see FIG. 5). The housing 106 may further include a second portion 78B of the mistake-proofing feature 78. The second portion 78B of FIG. 3B includes a protrusion (e.g., a pin) positioned within the recess 80. Positioning the base 76 in the recess 80 such that the first portion 78A engages the second portion 78B may facilitate installation of the snorkel 64 with the correct predetermined position and orientation relative to the housing 106 and/or the engine case 62. In some embodiments, for example, where the base 76 is mounted directed to the engine case 62, the engine case 62 may include the second portion 78B.

Figure 4A:
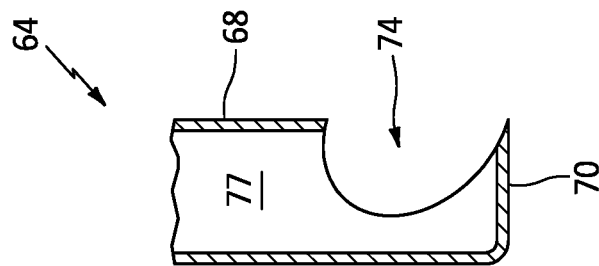
FIGS. 4A-B illustrate side, cross-sectional views of portions of an intake device, in accordance with one or more embodiments of the present disclosure.
Figure 4B:
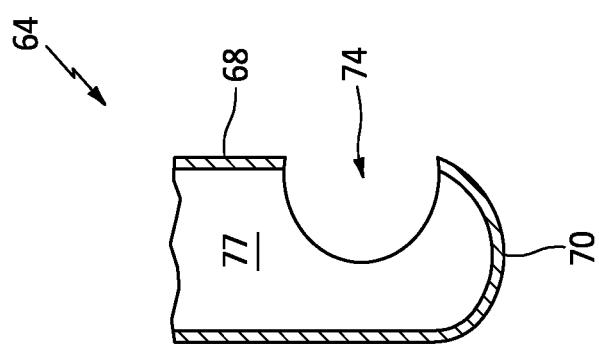

The tubular body 68 and inlet aperture 74 may be configured with a variety of orientations and shapes. FIGS. 4A and 4B illustrate sectional views of a portion of the tubular body 68 including the inlet aperture 74. The closed end 70 of FIG. 4A is substantially flat (e.g., planar). The inlet aperture 74 of FIG. 4A intersects or substantially intersects the closed end 70. The inlet aperture 74 of FIG. 4B is spaced (e.g., radially spaced) from the closed end 70. The closed end 70 of FIG. 4B has a rounded (e.g., hemispherical) shape. The closed end 70 may be rounded to provide a smooth aerodynamic profile. The snorkel 64 of the present disclosure, of course, is not limited to the foregoing exemplary tubular body 68 and/or inlet aperture 74 configurations of FIGS. 4A and 4B.

Referring to FIGS. 5-8, the intake device 56 includes a particle separator 82. The particle separator 82 may be positioned within or downstream of the snorkel 64. The particle separator 82 is positioned downstream of the inlet aperture 74 and, therefore, configured to receive gas which enters the snorkel 64 via the inlet aperture 74. As will be discussed in further detail, the particle separator 82 includes at least one gas flow passage extending between a flow inlet and a flow outlet. The particle separator 82 is configured to separate particulate matter from the gas entering the snorkel 64 via the inlet aperture 74, thereby preventing the conveyance of particulate matter to downstream components such as the bleed-off valve 46 (see FIG. 1). In particulate, the at least one gas flow passage of the particle separator 82 is configured to remove particulate matter from the at least one gas flow passage between the flow inlet and the flow outlet. In other words, flow characteristic of the at least one gas flow passage such as, but not limited to, a shape, a flow direction, a flow orientation, a turn radius, a flow area, etc. of the at least one gas flow passage, is configured to cause particulate matter to be removed from the at least one gas flow passage (e.g., in contrast to a filter which separates and retains particulate matter from the air within a gas flow passage). As will be discussed in further detail, the particle separator 82 may be configured as a centrifugal particle separator. The present disclosure particle separator 82 may be particularly relevant for bleed systems which experience relatively high velocity gas flow rates, thereby allowing centrifugal separation of particulate matter from surrounding gas. However, the present disclosure is not limited to any particular gas flow rates through the intake device 56 and/or particle separator 82.

In some embodiments, the intake device 56 may include or otherwise be in fluid communication with a collection chamber 84 configured to collect and store the particulate matter which is separated from surrounding gas by the particle separator 82. The collection chamber 84 may be in fluid communication with the particle separator 82 and downstream of the inlet aperture 74. In some embodiments, the collection chamber 84 may be formed by the chamber 126 of the housing 106, while in some other embodiments, the collection chamber 84 may be independent of the chamber 126. The collection chamber 84 may be configured to be selectively detachable from the intake device 56 or to otherwise be accessed (e.g., by one or more openings) to allow particulate matter to be periodically removed from the collection chamber 84.

Referring to FIG. 5, a cutaway view of an embodiment of the intake device 56 is illustrated. The intake device 56 of FIG. 5 includes the particle separator 82 positioned within the tubular body 68 of the snorkel 64. The particle separator 82 may have a curvilinear (e.g., helical, serpentine, etc.) shape extending in a direction between the closed end 70 and the open end 72 of the tubular body 68. The exemplary particle separator 82 shown in FIG. 5 includes a helical member 86 which defines a helical flow path 88 (e.g., a gas flow passage) for gas entering the snorkel 64 via the inlet aperture 74. The helical flow path 88 includes one or more turns (e.g., 360 degree turns about a turn center axis). The helical flow path 88 defined by the helical member 86 of FIG. 5 extends from the inlet aperture 74 toward the open end 72 of the tubular body 68.

The collection chamber 84 of FIG. 5 is positioned in fluid communication with the helical flow path 88 defined within the tubular body 68 by the helical member 86. The collection chamber 84 may be in fluid communication with an intermediate turn of the helical flow path 88 as shown in FIG. 5, however, the present disclosure is not limited to this particular configuration of the collection chamber 84. As shown in FIG. 5, the collection chamber 84 may be formed in a portion of the engine case 62 and positioned adjacent the tubular body 68 of the intake device 56. In alternative embodiments, the collection chamber 84 may be defined by a portion of the intake device 56. The tubular body 68 may include a particle separator aperture 90 which is aligned with an inlet 92 of the collection chamber 84. The particle separator aperture 90 may be formed through a portion of the tubular body 68 between the closed end 70 and the open end 72. Particulate matter entrained in gas traversing the helical flow path 88 may be centrifugally displaced to an outer region of the helical flow path 88 (e.g., adjacent the tubular body 68) and may be directed out of the helical flow path 88, through the particle separator aperture 90 and inlet 92 and into the collection chamber 84. Accordingly, pressurized gas exiting the snorkel 64 via the open end 72 of the tubular body 68, and thereby supplied to downstream components including the bleed-off valve 46 (see FIG. 1), may be free of or substantially free of particulate matter or otherwise may include a substantially reduced quantity of particulate matter. In some embodiments, the intake device 56 may include the mistake-proofing feature 78 to ensure appropriate alignment between the particle separator aperture 90 of the tubular body 68 and the inlet 92 of the collection chamber 84, when the intake device 56 is installed in the engine case 62.

Figure 6:
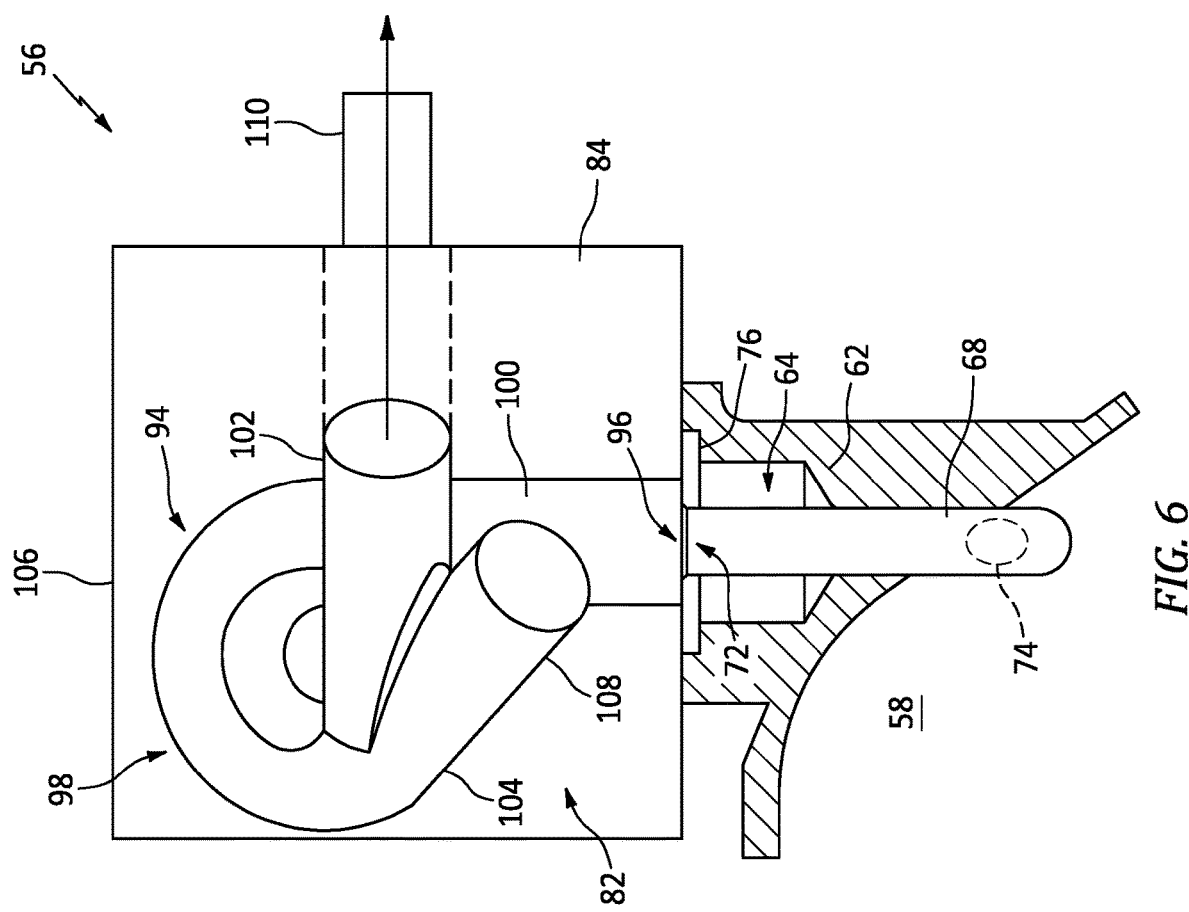
FIG. 6 illustrates a cutaway view of an intake device, in accordance with one or more embodiments of the present disclosure.

Referring to FIG. 6, a cutaway view of another embodiment of the intake device 56 is illustrated. The particle separator 82 of FIG. 6 is in fluid communication with the snorkel 64 and positioned downstream of the open end 72 of the tubular body 68. The particular separator 82 of FIG. 6 includes a curved channel 94 (e.g., a gas flow passage). The curved channel 94 includes an inlet end 96 positioned adjacent the open end 72 of the tubular body 68. The inlet end 96 of the curved channel 94 may be mounted to or otherwise positioned adjacent the base 76 and in fluid communication with the open end 72 of the tubular body 68. The inlet end 96 of the curved channel 94 may be mounted to the base 76 of the snorkel 64. The curved channel 94 includes at least one turn 98 located in an intermediate portion of the curved channel 94. As shown in FIG. 6, the at least one turn 98 may include a single turn. The single turn may extend, for example, approximately 240 to 300 degrees about a center axis of the at least one turn 98. The single turn may extend, for example, approximately 270 degrees about the center axis of the at least one turn 98. In some other embodiments, the at least one turn 98 may include a plurality of turns (e.g., a plurality of turns defining a helical flow path).

The curved channel 94 includes an inlet passage 100 extending between the inlet end 96 of the curved channel 94 and the at least one turn 98. The curved channel 94 further includes an inner diameter passage 102 and an outer diameter passage 104 which is separated from the inner diameter passage 102. The inner diameter passage 102 and the outer diameter passage 104 are located downstream of the at least one turn 98. The curved channel 94 is split downstream of the at least one turn 98 to independently define the inner diameter passage 102 and the outer diameter passage 104.

The inner diameter passage 102 and the outer diameter passage 104 may be positioned relative to the at least one turn 98 such that the inner diameter passage 102 has a first radius of curvature which is different than a second radius of curvature of the outer diameter passage 104. The radius of curvature may be understood as a distance between a center axis of the at least one turn 98 and a substantial center of the respective inner diameter passage 102 and outer diameter passage 104. Thus, for the curved channel 94 of FIG. 6, the second radius of curvature of the outer diameter passage 104 is greater than the first radius of curvature of the inner diameter passage 102. Gas ingested via the snorkel 64 are forced through the at least one turn 98 prior to entering the inner diameter passage 102 or the outer diameter passage 104. Particulate matter entrained in gas flowing within the at least one turn 98 may be centrifugally displaced towards a radially outer portion of the curved channel 94 and may then be directed into the outer diameter passage 104 of the curved channel 94. Accordingly, pressurized gas exiting the curved channel 94 via the inner diameter passage 102, and thereby supplied to downstream components including the bleed-off valve 46 (see FIG. 1), may be free of or substantially free of particulate matter or otherwise may include a substantially reduced quantity of particulate matter.

In some embodiments, the housing 106 of the intake device 56 may surround all or a portion of the curved channel 94. In some embodiments, the housing 106 may define the collection chamber 84 for particulate matter exhausted from the outer diameter passage 104. For example, a terminal end 108 of the outer diameter passage 104 may be located within the housing 106. The housing 106 may include one or more openings (not shown) to provide access to the collection chamber 84 for periodic removal of particulate matter. The inner diameter passage 102 of the curved channel 94 may be fluidly coupled to the outlet 110 of the housing 106.

Figure 7:
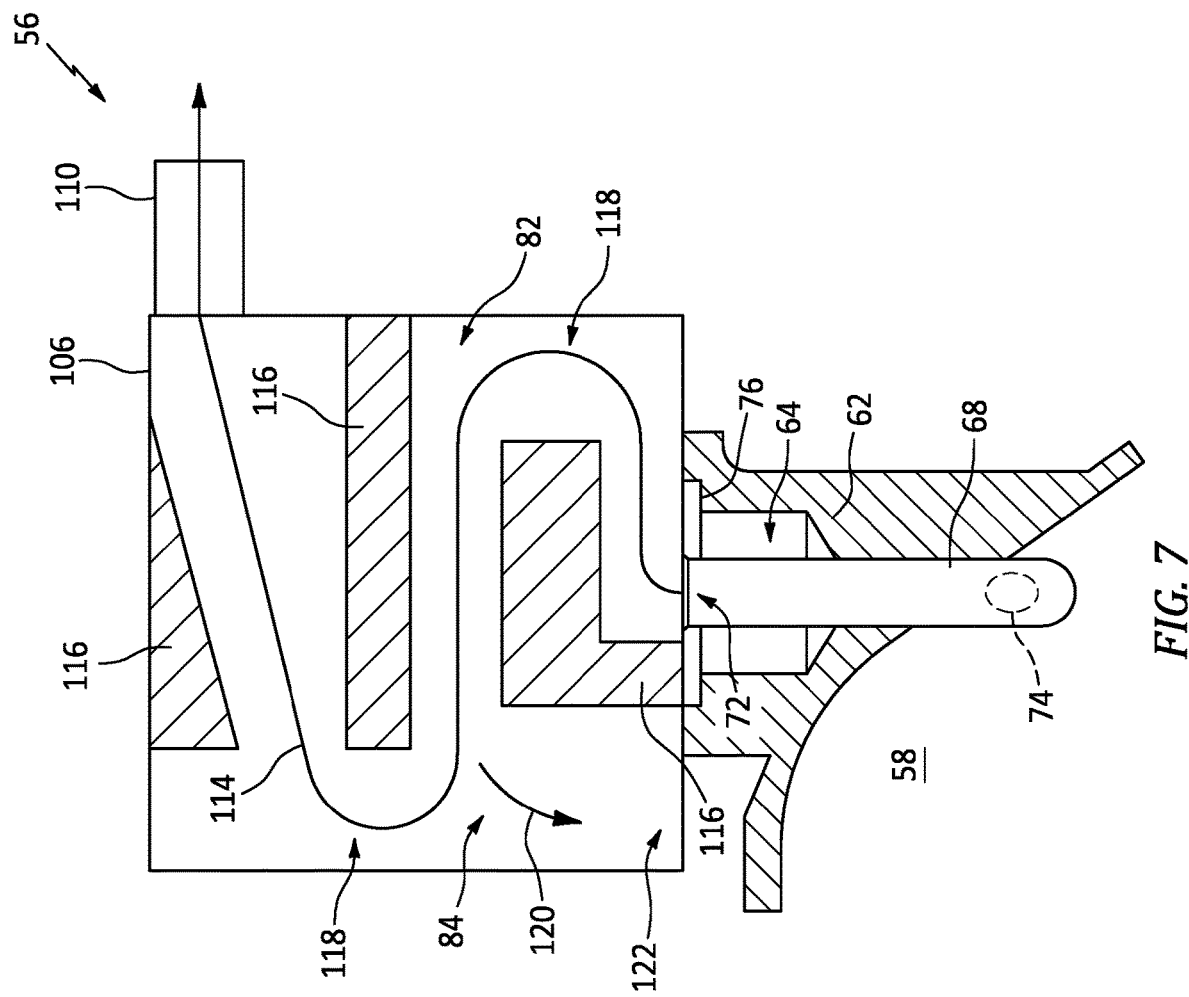
FIG. 7 illustrates a cross-sectional view of an intake device, in accordance with one or more embodiments of the present disclosure.

Referring to FIG. 7, a cross-sectional view of another embodiment of the intake device 56 is illustrated. The intake device 56 of FIG. 7 includes the housing 106 mounted to the base 76 of the snorkel 64. The housing 106 surrounds and defines the collection chamber 84 downstream of the snorkel 64 (e.g., downstream of the open end 72 of the tubular body 68). The outlet 110 is in fluid communication with the bleed-off valve 46 (see FIG. 1). The collection chamber 84 includes a serpentine passage 112 defining a bleed flow path 114 (e.g., a gas flow passage) between the open end 72 of the tubular body 68 and the outlet 110. The intake device 56 may include one or more internal walls 116 mounted to the housing 106 within the collection chamber 84. The internal walls 116 may define the serpentine passage 112 through the collection chamber 84. The internal walls 116 may define one or more turns 118 of the serpentine passage 112. As shown in FIG. 7, particulate matter (schematically illustrated in FIG. 6 as particulate matter 120) entrained with the gas traveling along the bleed flow path 114 may become separated from the gas traveling along the bleed flow path 114 in the one or more turns 118 of the serpentine passage 112. The separated particulate matter 120 may settle in one or more low flow portions 122 of the collection chamber 84 which are outside of the bleed flow path 114. Accordingly, pressurized gas exiting the collection chamber 84 via the outlet 110, and thereby supplied to downstream components including the bleed-off valve 46 (see FIG. 1), may be free of or substantially free of particulate matter or otherwise may include a substantially reduced quantity of particulate matter.

Figure 8:
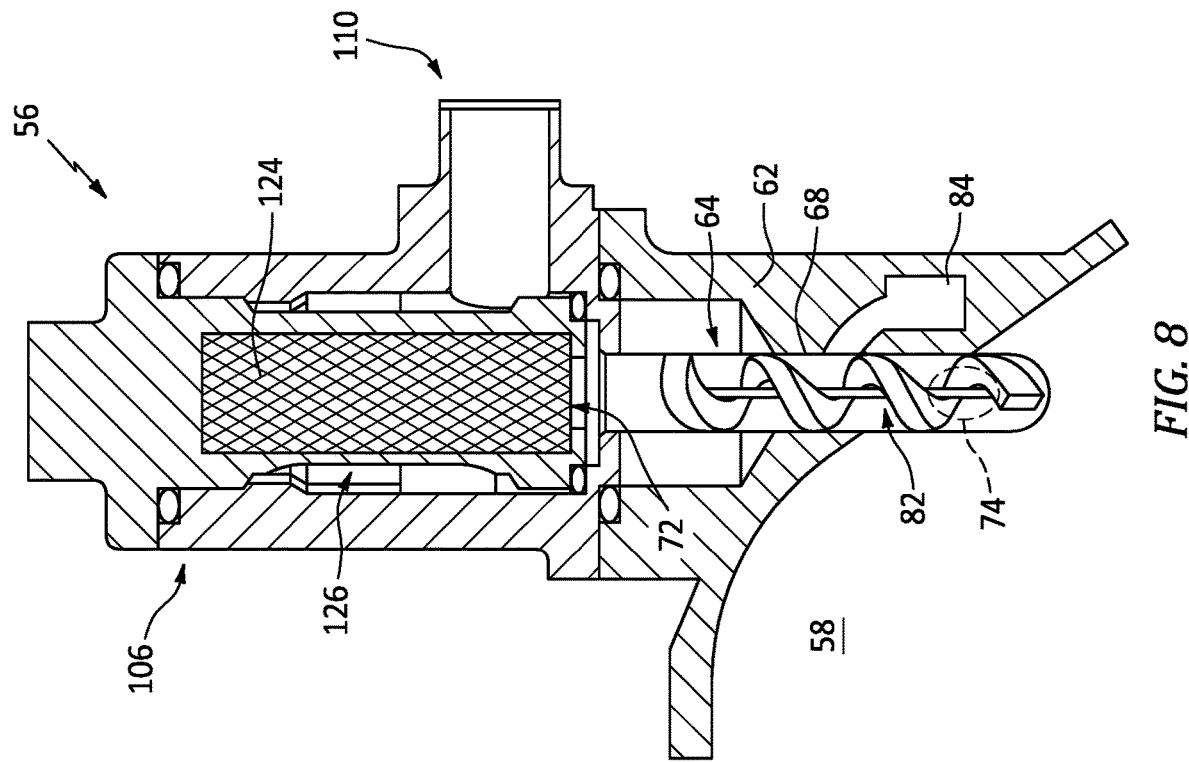
FIG. 8 illustrates a cutaway view of an intake device, in accordance with one or more embodiments of the present disclosure.

Referring to FIG. 8, the intake device 56 may include a filter 124 disposed downstream of the particle separator 82. The filter 124 may be disposed inside the housing 106 within the chamber 126. Gas exiting the open end 72 of the tubular body 68 are directed through the filter 124 prior to exiting the intake device 56 via the outlet 110. While the use of a filter, such as the filter 124, is not required by the present disclosure intake device 56, in some applications, additional removal of particulate matter may be desired. The particle separator 82 may substantially decrease the amount of particulate matter which reaches the filter 124 and may, therefore, extend the operational life of the filter 124, relative to an intake device which does not include a particle separator such as the particle separator 82.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. An intake device for a gas turbine engine, the intake device comprising:
   a snorkel configured to be mounted to a panel defining at least a portion of a gas flow path within the gas turbine engine, the snorkel including a tubular body extending between a closed end and an open end opposite the closed end, the snorkel further including an inlet aperture formed through the tubular body adjacent the closed end, at least a portion of the snorkel configured to be disposed within the gas flow path;
   a particle separator mounted to the snorkel downstream of the inlet aperture, the particle separator including at least one gas flow passage extending between a flow inlet and a flow outlet, the at least one gas flow passage configured to remove particulate matter from the at least one gas flow passage upstream of the flow outlet; and
   a collection chamber in fluid communication with the at least one gas flow passage;
   wherein the particle separator includes a curved channel located downstream of the open end of the tubular body, the curved channel including an inlet passage including the flow inlet, the curved channel further including an inner diameter passage and an outer diameter passage separated from the inner diameter passage, the inner diameter passage and the outer diameter passage located downstream of the inlet passage, the inner diameter passage having a first radius of curvature which is different than a second radius of curvature of the outer diameter passage.

2. The intake device of claim 1, further comprising a filter disposed downstream of the particle separator.

3. A gas turbine engine comprising:
   a compressor section disposed about an axial centerline of the gas turbine engine, the compressor section defining a portion of a core flow path through the gas turbine engine;
   a cavity disposed downstream of the compressor section with respect to the core flow path;
   an engine case disposed about the axial centerline, the engine case surrounding the cavity; and
   an intake device mounted to the engine case, the intake device in fluid communication with the cavity, the intake device configured to receive pressurized bleed gas from the cavity, the intake device comprising:
      a snorkel including a tubular body extending between a closed end and an open end opposite the closed end, the snorkel further including an inlet aperture formed through the tubular body proximate the closed end, the inlet aperture positioned within the cavity;
      a particle separator mounted to the snorkel downstream of the inlet aperture, the particle separator including at least one gas flow passage extending between a flow inlet and a flow outlet, the at least one gas flow passage configured to remove particulate matter from the at least one gas flow passage upstream of the flow outlet; and
      a collection chamber in fluid communication with the at least one gas flow passage upstream of the flow outlet, the collection chamber is formed in a portion of the engine case and the collection chamber is positioned adjacent the tubular body of the intake device.

4. The gas turbine engine of claim 3, further comprising a bleed-off valve in fluid communication with the intake device, the bleed-off valve configured to receive the pressurized bleed gas from the intake device.

5. The gas turbine engine of claim 4, wherein the bleed-off valve is in fluid communication with the core flow path within the compressor section via a pressure relief line.

6. The gas turbine engine of claim 4, further comprising a pneumatic actuator in fluid communication between the intake device and the bleed-off valve, the pneumatic actuator configured to operate the bleed-off valve between a closed position and an open position in response to pressurized bleed gas supplied to the pneumatic actuator from the intake device.

7. The gas turbine engine of claim 6, further comprising an orifice pack in fluid communication between the intake device and the pneumatic actuator.

8. The gas turbine engine of claim 3, wherein the compressor section is configured to impart a swirl component on the pressurized bleed gas within the cavity, wherein the swirl component has a swirl direction about the axial centerline of the gas turbine engine, and wherein the inlet aperture of the snorkel is located facing away from the swirl direction.

9. The gas turbine engine of claim 3, further comprising a combustor, wherein the intake device is located in the core flow path between the compressor section and the combustor.

10. The gas turbine engine of claim 3, wherein the intake device includes a mistake-proofing feature.

11. The gas turbine engine of claim 3, wherein the inlet aperture is spaced radially inward of the engine case with respect to the axial centerline.

12. An intake device for a gas turbine engine, the intake device comprising:
   a snorkel configured to be mounted to a panel defining at least a portion of a gas flow path within the gas turbine engine, the snorkel including a tubular body extending between a closed end and an open end opposite the closed end, the snorkel further including an inlet aperture formed through the tubular body adjacent the closed end, at least a portion of the snorkel configured to be disposed within the gas flow path;

a particle separator mounted to the snorkel downstream of the inlet aperture, the particle separator including at least one gas flow passage extending between a flow inlet and a flow outlet, the at least one gas flow passage configured to remove particulate matter from the at least one gas flow passage upstream of the flow outlet; and further comprising a housing mounted to the snorkel, the housing defining a collection chamber, the collection chamber located downstream of the open end of the tubular body, the collection chamber including a chamber outlet, the collection chamber including a serpentine passage defining a bleed flow path between the open end of the tubular body and the chamber outlet.

* * * * *